United States Patent
Whiter

(10) Patent No.: US 9,682,498 B2
(45) Date of Patent: Jun. 20, 2017

(54) SEMI-PREG MATERIAL WITH A PROPERTY-ENHANCING SURFACE FILM FOR IMPROVED PROPERTIES

(75) Inventor: Mark Whiter, Dublin, CA (US)

(73) Assignee: Hexcel Composites Limited, Duxford (GB)

( * ) Notice: Subject to any disclaimer, the term of this patent is extended or adjusted under 35 U.S.C. 154(b) by 227 days.

(21) Appl. No.: 13/120,066

(22) PCT Filed: Sep. 24, 2009

(86) PCT No.: PCT/EP2009/062354
§ 371 (c)(1),
(2), (4) Date: Mar. 21, 2011

(87) PCT Pub. No.: WO2010/037680
PCT Pub. Date: Apr. 8, 2010

(65) Prior Publication Data
US 2011/0171034 A1    Jul. 14, 2011

(30) Foreign Application Priority Data
Sep. 30, 2008 (EP) .................... 08017243

(51) Int. Cl.
| | | |
|---|---|---|
| B32B 5/02 | (2006.01) |
| B32B 27/12 | (2006.01) |
| B32B 37/02 | (2006.01) |
| B29C 37/00 | (2006.01) |
| C08J 5/24 | (2006.01) |

(Continued)

(52) U.S. Cl.
CPC ............. *B29C 37/0067* (2013.01); *C08J 5/24* (2013.01); *B29C 70/086* (2013.01); *B29C 70/50* (2013.01); *B29K 2063/00* (2013.01); *B29K 2101/10* (2013.01); *B29L 2031/08* (2013.01); *C08J 2363/00* (2013.01); *Y10T 428/24124* (2015.01);

(Continued)

(58) Field of Classification Search
CPC ....... B29C 7/067; B29C 70/50; B29C 70/086; C08J 5/24; B29B 15/12; B29B 15/122; Y10T 428/24995
USPC ...................................................... 428/300.7
See application file for complete search history.

(56) References Cited

U.S. PATENT DOCUMENTS

| | | |
|---|---|---|
| 4,228,113 A | 10/1980 | van Gasse |
| 6,139,942 A | 10/2000 | Hartness et al. |

(Continued)

FOREIGN PATENT DOCUMENTS

| | | |
|---|---|---|
| EP | 488389 | 6/1992 |
| EP | 0816438 | 7/1998 |

(Continued)

OTHER PUBLICATIONS

WO2008-143044, Nov. 27, 2008, Tomioka et al., translated.*

*Primary Examiner* — Camie Thompson
(74) *Attorney, Agent, or Firm* — W. Mark Bielawski; David J. Oldenkamp

(57) ABSTRACT

Semi-preg material is disclosed adapted for use in composite material comprising a) a first resin layer, b) covered on both side by layers of fibrous reinforcements whereby c) one of the two fabric layers is coated with a second resin layer and d) wherein said second resin layer has a tack level of not more than 100 N. Such semi-preg material has improved handling properties and contributes to the superior mechanical properties of the composite material formed therewith.

20 Claims, 4 Drawing Sheets

Structure of semi-preg with property enhancing resin film on one outer surface.

(51) Int. Cl.
   *B29C 70/08*   (2006.01)
   *B29C 70/50*   (2006.01)
   *B29K 63/00*   (2006.01)
   *B29K 101/10*  (2006.01)
   *B29L 31/08*   (2006.01)

(52) U.S. Cl.
   CPC ............... *Y10T 428/249921* (2015.04); *Y10T 428/249942* (2015.04); *Y10T 428/27* (2015.01)

(56) References Cited

U.S. PATENT DOCUMENTS

| | | | |
|---|---|---|---|
| 7,261,930 B2 * | 8/2007 | Ellis | 428/114 |
| 7,267,868 B2 * | 9/2007 | Gallet et al. | 428/292.1 |
| 2004/0071948 A1 | 4/2004 | Gallet et al. | |
| 2006/0231981 A1 | 10/2006 | Lee et al. | |
| 2008/0188609 A1 * | 8/2008 | Agarwal et al. | 524/504 |
| 2010/0143145 A1 * | 6/2010 | Jones | 416/230 |
| 2010/0222522 A1 * | 9/2010 | Steele et al. | 525/420 |
| 2010/0228001 A1 * | 9/2010 | Mortimer | 528/322 |

FOREIGN PATENT DOCUMENTS

| | | | |
|---|---|---|---|
| EP | 1342544 | | 9/2003 |
| EP | 1144191 | | 12/2003 |
| EP | 1553125 | | 7/2005 |
| EP | 1128958 | | 8/2005 |
| EP | 1595689 | | 11/2005 |
| EP | WO 2007/083084 | * | 7/2007 |
| EP | WO2008-143044 | * | 11/2008 |
| GB | 2445929 | | 7/2008 |
| WO | 00/27632 | | 5/2000 |
| WO | 2007/110617 | | 10/2007 |
| WO | 2008/087467 | | 7/2008 |

* cited by examiner

Figure 1 – Structure of semi-preg with property enhancing resin film on one outer surface.

Figure 2 – Graph showing improvement in G1c performance in laminates prepared with semi-preg with property enhancing film Figure 3 – Graph showing improvement in ILSS performance in laminates prepared with semi-preg with property enhancing film

SEMI-PREG MATERIAL WITH A PROPERTY-ENHANCING SURFACE FILM FOR IMPROVED PROPERTIES

1. FIELD OF THE INVENTION

The present invention relates generally to semi-preg materials and related structural composite materials. Composite materials are typically made of prepreg or semi-preg materials which are formed by placing different layers of said material one over the other and polymerizing the resin preferably by raising the temperature. When larger structures are formed the single layers of the preimpregnated fibre material must be placed one layer over the other and air which may be entrapped between the layers has to be removed by applying vacuum. Since remaining air bubbles in the composite material create voids in the cured laminate and since such areas weaken the mechanical stability of the composite material, the composite material is frequently evacuated in a specific device before polymerization takes place.

2. DESCRIPTION OF RELATED ART

U.S. Pat. No. 6,139,942 discloses partially impregnated preforms which are formed of a plurality of several layers of continuous fibre material having a partially impregnated resin on one or both faces of the fibre material.

EP-A 1 553 125 describes uncured fibre reinforced assemblies for application in the ski-snowboard industry. The prepreg materials comprise a fibrous reinforcement face together with a matrix resin.

GB-A 2 445 929 discloses a moulding material comprising a dry fibrous reinforcement layer having a surface resin material conjoined to a first surface and a structural resin material layer conjoined to the second surface thereof.

EP-A 488 389 discloses a prepreg for fibre-reinforced composite materials wherein a reinforcing fibre is covered by a fibrous thermoplastic resin.

European patent application 1 128 958 describes moulding materials which are formed by a prepreg comprising a layer of fabric on both sides of the central resin layer. The outer surfaces of the prepreg should be free from resin and dry to touch.

Since the resin of the central layer tends to move through the fibres of the fibrous layers mainly due to cold flow the outer surfaces of the fibre layers become more and more resinous depending on time and storage conditions, in particular temperature. Therefore said fibrous layers become impregnated with resin and more and more tacky.

Semi-preg material is usually produced by providing first a central resin layer whereby the thickness is frequently adjusted with a doctors blade which is subsequently covered on one or both sides with fabric material. The semi-preg sheets are cut into the desired format and wound up on rolls. The semi-preg material is stored in the form of rolls shipped to the customer and used to form composite material by placing the plies of the semi-preg material one over the other. Residual air between the plies of the semi-preg material is removed by a suitable device (e.g., vacuum) and the resin is polymerized preferably by raising the temperature in order to initiate polymerization.

During storage the resin of the resin layer is driven by capillary forces of the fabric fibres and by cold flow whereby said resin moves through the fibres of the fabric layers. Consequently said fabric layers contain more resin depending on the storage time and said fabric layers become more and more tacky. Such tacky areas result in an undesired adhesion of the semi-preg layers. In order to allow a proper separation of the semi-preg layers when the rolled semi-preg material is unwound an intermediate layer of material (interleaf) may be provided. Such material has a non-sticky surface and must be removed in the course of processing. Suitable interleaf materials include polypropylene, e.g., 100 micron, 124 embossed foil available from Huhtamaki, Forchheim, Germany.

It turns out, however, that sometimes the intermediate layer (interleaf) sticks to the outer surface of the fabric which contains resin on its outer surface and causes tackiness between the fibre layer and the intermediate material. If no interleaf is present and the semi-preg is unwound from the storage rolls it may happen that the fibrous layers which have some resin on the surfaces stick to each other or to the interleaf. By rolling up the semi-preg fibre material with no intermediate layer it may stick so tightly together that the structure of the fibres is disturbed in the course of unwinding and even small pieces of fibre and/or resin may tack to the place of the prepreg which was in contact with the intermediate layer during the storage time. The sticking together of the two semi-preg layers may therefore result in an unevenness of the unrolled semi-preg material which results in defects or bad spots of the surface or disruption of the fibres of the composite material. Also, sometimes pieces of the intermediate material are torn away during unrolling of the semi-preg and adhere to the semi-preg (rather than coming away cleanly with the rest of the interleaf material). In the cured composite material, these pieces of intermediate material can cause surface defects and require time-consuming remediation or a reduction in mechanical properties which therefore render the cured component unusable and needing to be scrapped.

The problem of the unevenness of the surface of the composite material is multiplied with each additional sheet of the semi-preg laid on the composite material and is perhaps even not solved satisfactorily by an interleaf between the prepreg during storage. A further disadvantage of this solution is that the intermediate material which is required only during the storage and transportation steps has to be removed after production which causes additional costs and waste.

3. SUMMARY OF THE INVENTION

The term "prepreg" is a term of art used in the field of composite material to fibrous reinforcements (e.g., unidirectional fibers, mats, fabric, non-woven material or roving) which has been preimpregnated with resin and which is ready for final curing.

As a subset of the art of prepregs, over the last several years, a technology has become available in the area of "semi-pregs", that is, fibrous reinforcements which are not fully impregnated with the resin attached thereto. Representative of the semi-preg art are EP 1 144 190, EP 0 960 155 or U.S. Pat. No. 4,228,113.

Basic principles of this technology and of relevant methods are described in "Manufacturing of Polymer Composites" by B. T. Astrom, Publ. Chapman & Hall, ISBN 0-412-81960-0 which is incorporated by reference herewith.

The semi-preg material of the present invention utilizes one ply of fibrous reinforcement having a substantial proportion of its fibers not impregnated with resin which allows improved air breathability when a composite component is being made from the semi-preg material of the present invention. The term "layer of fibrous reinforcements" comprises all types of fiber material usable in the field, preferably bundles of fibers stitched together and also designated as fabric layers.

The semi-preg material is adapted for use in multiple layers and comprises a first resin layer, which is covered on both side by a fabric layer whereby at least one of the two fabric layers is coated with a second resin layer, preferably said second resin layer has a tack level of not more than 100 N, preferably not more than 15 N.

The first resin layer is covered on both sides with a fabric layer and is present in an amount ranging from about 100 to 800 g/m$^2$ (gsm), preferably in an amount of 300 to 650 g/m$^2$ (gsm) and more preferred 450 to 600 g/m$^2$ (gsm). The resin is a thermosetting resin suitable for composite material and is preferably selected from the group comprising phenol formaldehyde resins, epoxy, polyester, vinylester, polyimide, cyanate ester, phenolic and bismaleimide resins and mixtures thereof.

In a preferred embodiment the semi-preg material of the present invention consists essentially of the resin layer which is covered on both sides by a fabric layer, whereby one of the two layers is coated with a second resin layer having a tack level of not more than 100 N.

In the process of forming the final product one layer of semi-preg material is laid over another semi-preg material and the layer of the fibrous reinforcement material comes into contact with the second resin layer having a tack level of not more than 100 N. The cross section of such stack has than the following layers: fibrous reinforcement, first layer of resin, fibrous reinforcement, second resin layer, fibrous reinforcement, first layer, fibrous reinforcement and so on.

In principle the thermosetting resin can be any known crosslinkable resin, which means curable or settable resin system like a phenolic resin, a melamine resin, an epoxy resin or alkyd resin.

The phenolic resin component of the central resin layer may comprise known condensation products of phenol and phenol derivatives with formaldehyde. Suitable phenol derivatives are in particular substituted phenols, in particular alkyl-substituted phenols such as cresols, xylenols and other alkylphenols such as p-tert-butylphenol, octylphenol and nonylphenol, but also arylphenols, such as phenylphenol, naphthols and 2-hydric phenols such as resorcinol and bisphenol A. Phenolic resins for the purposes of this invention include not only the condensation products of the individual compounds mentioned but also condensation products of mixtures of the above-mentioned phenols and phenol derivatives with formaldehyde. If individual compounds are to be used for preparing the phenolic resins, it must be borne in mind that they must be at least triple functional toward formaldehyde. To optimize particular properties the phenolic resins mentioned may also have been modified in a conventional manner with additions of unsaturated natural or synthetic compounds, for example tung oil, rosin or styrene. Particular preference is given to condensation products of formaldehyde with phenol itself and mixtures of phenol with minor amounts of the phenol derivatives mentioned, in particular the alkyl-substituted phenols mentioned.

Suitable epoxy resins include diglycidyl ethers of bisphenol A, diglycidyl ethers of bisphenoi F, epoxy novolac resins and N-glycidyl ethers, glycidyl esters, aliphatic and cycloaliphatic glycidyl ethers, glycidyl ethers of aminophenols, glycidyl ethers of any substituted phenols, monomers containing acrylate and methacrylate groups (such as glycidyl methacrylates, epoxy acrylates and hydroxyacrylates) and mixtures thereof.

In preferred embodiments the monomers as described above are blended depending on the properties of the final composite material prepared from the semi-preg. Such formulated resin mixtures contain all components required for a proper polymerization of the thermosetting resin.

The resin layer is coated on both sides with a fabric which has preferably a non-woven structure. The fabric layer is preferably a fibre layer which may be formed from suitable fibres, preferably bundled into tows and stitched together in order to hold the fabric layer together. Suitable fibres include glass fibres, carbon fibres and polymeric fibres such as polyethylene fibres and aramide fibres. Glass fibres are preferably made from E-glass, S-glass, C-glass, T-glass or R-glass. Suitable aramide fibres include those sold under trademarks like Kevlar®. Organic fibres and modified organic fibres can also be used. The fabric layer consists preferably of bundles of fibres which are loosely kept to each other. The orientation of the fibre bundles may be either in an orientation parallel to the longitudinal axis (warp direction) of the resin layer)(0°) or the fibres may be in an orientation which ranges from −80° to −30° and from +30° to +80° orientation, preferably from +/−30° to +/−45°.

Fibrous reinforcements in other forms may also be used, e.g., woven fabric, plies of aligned unidirectional fibers, mats, etc.

In a preferred embodiment the two fabric layers which coat the central resin layer are orientated in a manner that one layer is in a +30° to +45° orientation wherein the other layer which is on the other side of the resin layer is in a −30° to −45° orientation. In an especially preferred embodiment the orientation of the layers is +30° on one side of the central resin layer and −30° on the other side of the resin layer.

The semi-preg material of the present invention has furthermore a second resin layer which is preferably made from a resin which is different from the resin which forms the central resin layer. Said second resin layer is preferably made from a bisphenolepoxy resin and has a very low tackiness.

The second resin layer has a rather low tack level which is in the range of 0 up to 100 N, preferably not more than 15 N, more preferred not more than 11 N. There are different methods for determining tack. Methods range from subjective "feel" of a material to using a more objective method such as a tensile tester. However, any such method using a tensile tester needs to be optimised depending on the material being tested. Therefore, a method for determining tack was developed.

In such method a Texture Analyser XT Plus system was used which employed a load cell fitted to a probe which is allowed to come into contact with the test sample. The probe is a piece of machined aluminium, cylindrical in shape (referred to as P/36R). The flat circular surface which comes into contact with the test sample has a diameter of 36 mm to allow for the test area to be representative. The load cell measures any force that is required to remove the probe from the sample. Small square samples measuring approximately 4 cm by 4 cm of semi-preg were attached to a plate using double-sided adhesive tape. The probe is then allowed to come into contact with the sample and a small force of 10 N is applied for 30 seconds to ensure full contact. The probe is then pulled away from the sample at a rate of 0.5 mm/sec. The peak force required to detach the probe from the sample is then recorded. The results show that the semi-preg using the property enhancing film (second resin layer) exhibited a lower, more consistent tack of 11.3 N with a standard deviation of 0.83 N compared to the standard semi-preg (without second resin layer) which exhibited a less consistent and higher tack level of 31.1 N with a standard deviation of 8.6 N (represented by box plots in FIG. 4).

In a further preferred embodiment the second resin layer comprises additional components which improve the mechanical properties of the composite material prepared from the semi-preg of the present invention. In a particular preferred embodiment the second resin layer contains toughness.

The semi-preg material of the present invention can preferably be used for the production of composite material which is used in the manufacture of large load bearing structures. Such large load bearing structures are preferably used in the aerospace industry for parts like wings or propellers for airplanes and a particular preferred embodiment of the composite material is the production of wind turbine blades.

The semi-preg material of the present invention can tolerate resin migration under storage conditions whereby no intermediate layer/interleaf is required. By avoiding the interleaf, not only waste can be eliminated but also the risk that any unremoved interleave sticked to the semi-preg material and trapped in the laminated component can be excluded. Moreover, the formation of bad spots in the final composite material is substantially reduced.

In a preferred embodiment the second resin layer comprises components which improve the mechanical properties of the composite material produced from the semi-preg material. Since the second resin layer limits the migration of the resin from the first (central) resin layer a more consistent tack over the whole breadth of the semi-preg is obtained.

Another advantage of the semi-preg material of the present invention is that a wider variety of the central resin layer can be used even if the resin has viscoelastic properties which may have too much cold flow. Such resins can be used since the second resin layer prevents a sticking together of adjacent layers of the semi-preg material during storage and/or transportation.

The invention utilizes a lightweight, substantially tack controlling resin film which preferably incorporates a rubber adducted BADGE toughening resin and is applied at a given weight to one or both surfaces of the semi-preg. Laminates constructed from semi-pregs using this property enhancing film have been shown to exhibit improved fracture toughness ($G_{1C}$) and interlaminar shear strength (ILSS) compared to laminates constructed from standard semi-preg materials.

This film forming the second resin layer is preferably formulated by using a combination of a solid bis-A epoxy (Epikote 1001) and the rubber toughening component (Polydis 3614) which reduces the highly variable surface tack to a more consistent lower tack thus providing more stable handling characteristics and obviates the need for an interleaf in certain cases.

Further mechanical performance enhancements can be achieved by using the resin film as a carrier to place thermoplastic toughening particles, such as polyamides or nano-sized core shell rubber particles at the interply regions thus providing localized toughening in the composite component. Preferred additives are Kaneace MX 181, Orgasol 1001 and the like.

A further important advantage of the present invention is that the semi-preg material of the present invention has improved adhesion properties to steel substrate.

4. DESCRIPTION OF THE DRAWINGS

The foregoing and other advantages and features of the invention and the manner in which the same are accomplished will become more readily apparent upon consideration of the following examples taken in conjunction with the accompanying drawings which illustrate preferred and exemplary embodiments.

FIG. 1 shows a preferred embodiment of the semi-preg of the present invention. The central resin layer is covered on both sides by fabric layers whereby the orientation of the fibres in the fabric layer above the central resin layer is +45° to the warp direction and the orientation in the fabric layer below the central resin layer is −45° to the warp direction. On top of the upper fabric layers there is the second resin layer prepared by a dry to touch/tack control film applied in an amount between 10 to 60 gsm, preferably 20 to 60 gsm.

FIG. 2 shows the improvement of the fracture toughness G1c obtainable by the semi-preg of the present invention. The graph shows on the left-hand side a standard semi-preg without the second resin layer. In the middle the semi-preg according to the invention with a second layer having 20 gsm is show whereby on the right-hand side a semi-preg according to the present invention with a second resin layer of 60 gsm is shown.

Figure 2:
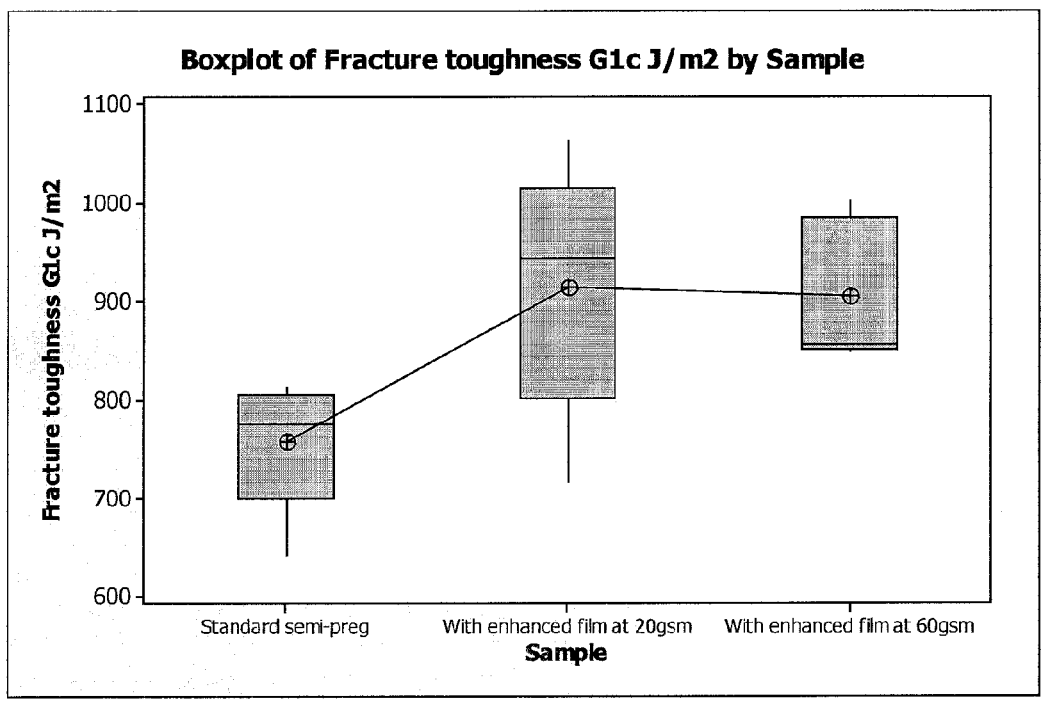
Figure 3:
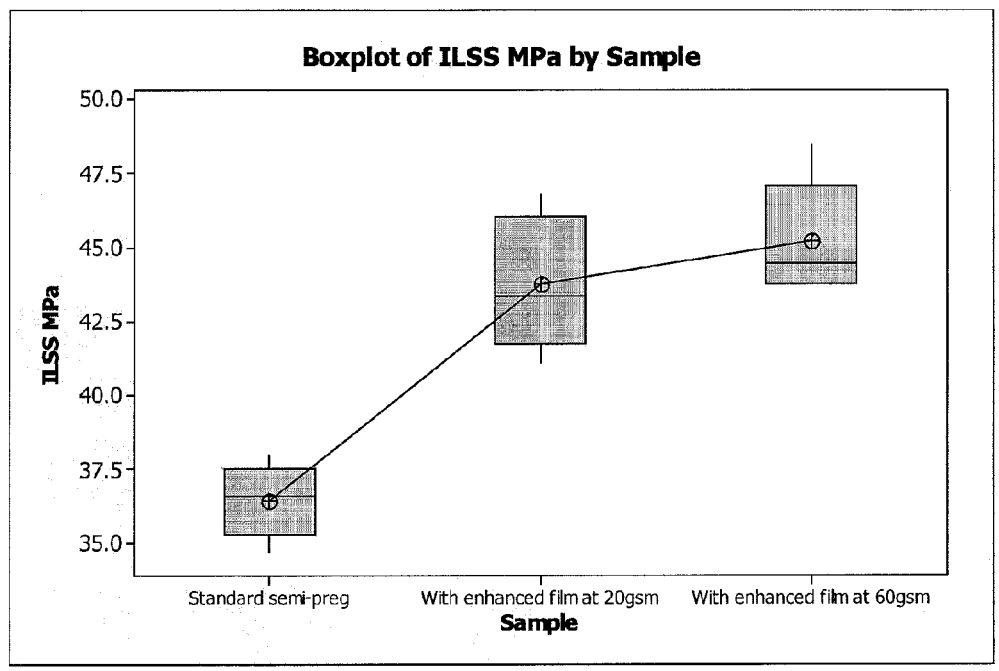
FIG. 3 shows the improvement of the interlaminar shear strength (ILSS) obtainable with the prepreg according to the present invention. On the left-hand side the prepreg without the second resin layer is shown, the sample in the middle contains a second resin layer with 20 gsm and on the right a semi-preg according to the invention with a second layer of 60 gsm is shown.

By comparing FIGS. 2 and 3 it becomes evident that by changing the amount of resin in the second resin layer from 20 gsm to 60 gsm the advantageous properties of the composite material prepared from the semi-preg of the present invention can be influenced. On the other hand, FIGS. 2 and 3 show that a substantial portion of the advantages possible with 60 gsm layers are already achieved with 20 gsm layers. This can be important in situations where weight is at a premium, e.g., aerospace components.

The following examples illustrate the invention and serve for illustrative purposes.

EXAMPLE 1

Standard semi-preg materials typically comprise a film of formulated resin to which a dry fibrous reinforcement is attached to one or both sides of the film usually by means of the inherent tack of the resin film.

The semi-preg material of the invention was constructed from a 340 gsm film layer of M9.6-LT, M9.6F-LT or M9.7 (an epoxy resin based on a blend of liquid, semi-solid and solid bisphenol-A epoxies, dicyandiamide and a urone) resin to which a layer of glass UD fibrous reinforcement is attached to either side of the film. One reinforcement layer typically possesses unidirectional fibres running at +45° or +30° to the warp (i.e. 0°) direction of the resin film and the other layer possesses the same unidirectional reinforcement fibres running at −45° or −30° to the warp direction. The reinforcement fibres for each layer are typically bundled into tows. These tows are stitched together in order to hold the fabric layer together.

Figure 1:
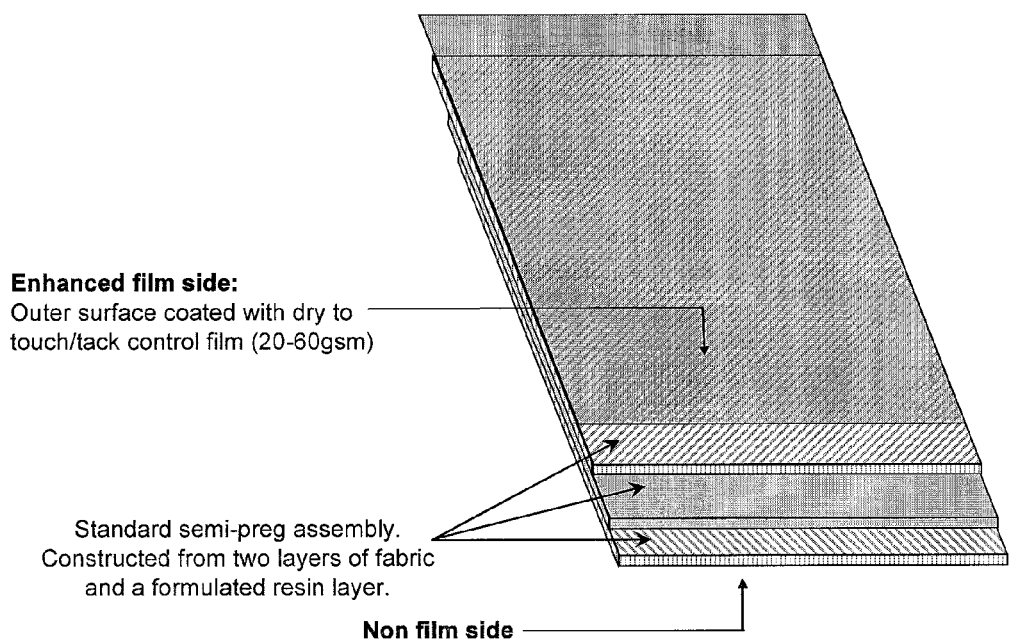

To the above semi-preg material a tack controlling, property enhancing resin film was applied which was prepared by blending at greater than 80° C. a mixture of molten solid bisphenol-A epoxy resin, such as Epikote 1001 (manufactured by Hexion Speciality Chemicals B.V., The Netherlands) at 75 parts per hundred and a rubber adducted liquid bisphenol-A epoxy resin, such as Struktol Polydis 3614 (manufactured by Schill and Seilacher, Germany) at 25 parts per hundred. This resin blend is referred to by Hexcel as DLS1765 and is then transferred on to the outer surface of the semi-preg as a film at 20-60 gsm or is first converted into a film supported on a silicone release paper before heat transferring to a surface of the semi-preg. The overall material structure is depicted in FIG. 1.

The DLS1765 can be modified by the addition of thermoplastic polyamide particles such as Orgasol 1002 DNAT 1 (manufactured by Arkema Inc, Philadelphia, US) at 10-15 parts per hundred. An alternative to DLS1765 resin blend is to substitute part or all of the Epikote 1001 with a solid bisphenol A epoxy resin containing nano sized core shell rubber particles, such as Kaneace MX181 (manufactured by Kaneka, Tex., US).

EXAMPLE 2

Fracture Toughness ($G_{1c}$) Improvement:

Eight ply laminates were constructed from standard semi-preg material and semi-preg material with the property enhancing film attached using +/−45° unidirectional fabrics. The laminates were constructed such that the two adjacent inner plies were orientated with fibres running in the 0° (i.e. test) direction. The rest of the laminate was constructed symmetrically with the plane of symmetry being between the two inner plies with the fibre directions (with respect to the test direction) as follows: 90°, 0°, 90°, 0°, 90°, 0°, 90°, 0°, 0°, 90° 0°, 90° 0°, 90° 0°, 90°. At one end of the construction a piece of non porous peel ply was inserted to act as a crack initiator for the fracture toughness test. The construction is then cured in a standard vacuum bag assembly and a standard cure cycle of 1 hour at 120° C.

The laminates were then prepared and tested to measure $G_{1c}$ performance according to AITM (Airbus Industrie Test Method) 1-0005 using an Instron 5569 test machine. Results showed that $G_1$ performance was improved from an average of 757 J/m² using standard semi-preg to >900 J/m² using semi-preg with the property enhancing film (represented by box plots in FIG. 2.

EXAMPLE 3

Interlaminar Shear Strength

ILSS testing according to BS (British Standard) EN 2563 using a Zwick 1445 test machine was performed on samples taken from the above laminates such that the inner 0° fibres ran lengthwise along the test specimens. Results showed that ILSS performance was improved from an average of 36.4 MPa using standard semi-preg to 43.8 MPa using semi-preg with a 20 gsm layer of property enhancing film to 45.3 MPa using semi-preg with a 60 gsm layer of property enhancing film (represented by box plots in FIG. 3).

EXAMPLE 4

Improved Tack Control

Figure 4:
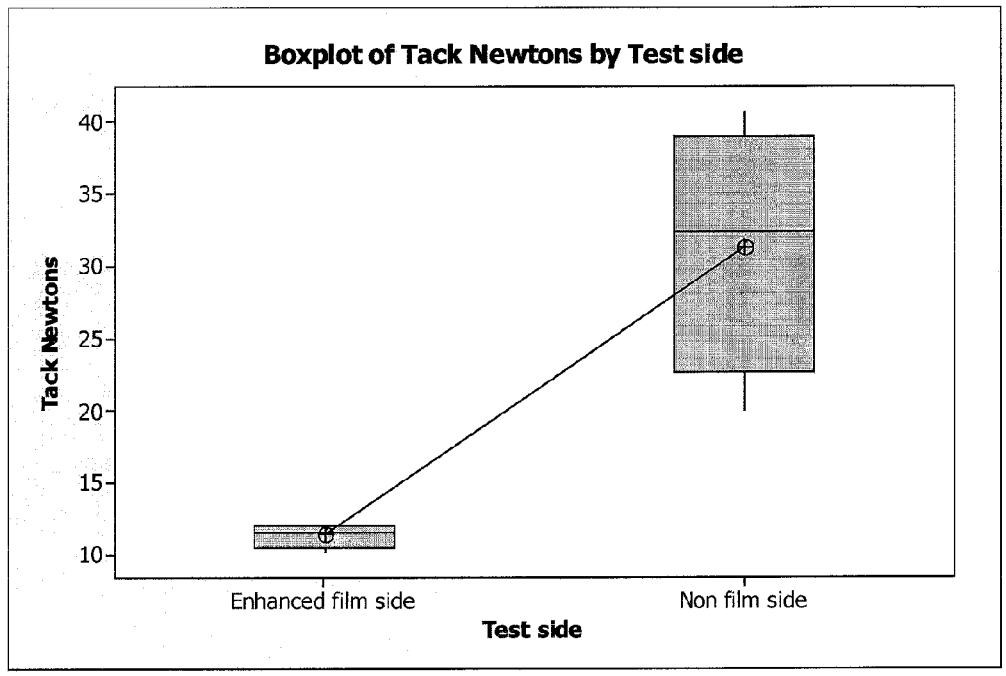
FIG. 4 shows how the tack properties of the semi-preg of the invention are improved by the second resin layer. Without the second resin layer the tack values range from about 20 to 38 whereas by using the second resin layer the tack is reduced to below 15 N.

A proprietary test method was developed using a Texture Analyser XT Plus system which employed a load cell fitted to a probe which is allowed to come into contact with the test sample. The probe is a piece of machined aluminium, cylindrical in shape (referred to as P/36R). The flat circular surface which comes into contact with the test sample has a diameter of 36 mm to allow for the test area to be representative. The load cell measures any force that is required to remove the probe from the sample. Small square samples measuring approximately 4 cm by 4 cm of semi-preg were attached to a plate using double-sided adhesive tape. The probe is then allowed to come into contact with the sample and a small force of 10 N is applied for 30 seconds to ensure full contact. The probe is then pulled away from the sample at a rate of 0.5 mm/sec. The peak force required to detach the probe from the sample is then recorded. The results show that the semi-preg using the property enhancing film exhibited a lower, more consistent tack of 11.3 N with a standard deviation of 0.83 N compared to the standard semi-preg which exhibited a less consistent and higher tack level of 31.1 N with a standard deviation of 8.6 N (represented by box plots in FIG. 4).

The invention claimed is:

1. A semi-preg material that is composed of a semi-preg having a first outer side and a second outer side where the tack of said first outer side varies from 20 to 38 N and where the tack of said first outer side is controlled by a property enhancing film that has a more consistent and reduced tack of from 10 to 15 N, said semi-preg material comprising:
   A) a semi-preg comprising:
      a) a first resin layer comprising an uncured thermosetting resin and a curing agent for said uncured thermosetting resin;
      b) a first layer of fibrous reinforcement located on one side of said first resin layer, said first layer of fibrous reinforcement, comprising an inner side adjacent to said first resin layer and an outer side that forms said first outer side of the semipreg, wherein a portion of said uncured thermosetting resin from said first resin layer has travelled through portions of said first layer of fibrous reinforcement from said inner side to said first outer side of the semipreg such that said first outer side of the semipreg has a tack that varies from 20 to 38 N;
      c) a second layer of fibrous reinforcement that is located on the other side of said first resin layer, said second layer of fibrous reinforcement having an inner side adjacent to said first resin layer and an outer side that forms said second outer side of the semipreg; and
   B) a property enhancing film comprising a mixture of uncured thermosetting resin and a rubber toughening component, said property enhancing film being in the form of a solid film that has an outer surface and an inside surface, said inside surface contacting and covering said first outer side of the semipreg, wherein said solid film weighs from 10 to 60 gsm and wherein the outer surface of said solid film has a tack level of 10 to 15 N to thereby control the tack level of the first outer side of said semi-preg to be more consistent and reduced.

2. Semi-preg material according to claim 1 wherein the first resin layer is present in an amount of 100 to 800 g/m² of the semi-preg material.

3. Semi-preg material according to claim 2 wherein the first resin layer is present in an amount of 350 to 650 g/m² of the semi-preg material.

4. Semi-preg material according to claim 1 wherein the fibres of said first layer of fibrous reinforcement are in +30 to +45' orientation.

5. Semi-preg material according to claim 4 wherein the fibres of said second layer of fibrous reinforcement are in −30° to −45° orientation.

6. Semi-preg material according to claim 1 wherein the first layer of fibrous reinforcement and the second layer of fibrous reinforcement are stitched together.

7. Semi-preg material according to claim 1 wherein said property enhancing film has a tack level that varies from 10 to 12 N.

8. Semi-preg material according to claim 1 wherein said first resin layer comprises an uncured thermosetting resin selected from the group consisting of phenol formaldehyde resins, epoxy, polyester, vinylester, polyimide, cyanate ester, phenolic and bismaleimide resins and mixtures thereof.

9. Semi-preg material according to claim 1 wherein said property enhancing film comprises uncured solid bis enol-epoxy resin, a rubber toughening component and polyamide particles.

10. A method for making a composite material comprising the steps of placing a semi-preg material according to claim 1 into a mold and curing said first resin layer and said property enhancing film to form a cured composite material.

11. A method for making a composite material according to claim 10 wherein said composite material forms at least part of a large load bearing structure.

12. A method for making a composite material according to claim 11 wherein said large load beating structure is a wind turbine blade.

13. A method for making a composite material according to claim 11 wherein said large load bearing structure is an aerospace structure.

14. A roll of semi-preg material comprising a semi-preg material according to claim 1 that has been formed into a roll wherein said property enhancing film is located adjacent to and in contact with said second layer of fiber reinforcement.

15. Semi-preg material according to claim 1 wherein said property enhancing film comprises uncured solid bisphenol-epoxy resin, a rubber toughening component and nano sized core/shell rubber particles.

16. A method for making a semi-preg material that composed of a semi-preg having a first outer side and a second outer side Where the tack of said first outer side varies from 20 to 38 N and where the tack of said first outer side is controlled by a property enhancing film that has a more consistent and reduced tack of from 10 to 15 N, said method comprising the steps of:

A) providing outside of the mold a semi-preg comprising:
  a) a first resin layer comprising an uncured liquid thermosetting resin and a curing agent for said uncured thermosetting resin;
  b) a first layer of fibrous reinforcement on one side of said first resin layer, said first layer of fibrous reinforcement comprising an inner side adjacent to said first resin layer and an outer side that forms said first outer side of the semipreg, wherein a portion of said uncured thermosetting resin from said first resin layer travels through portions of said first layer of fibrous reinforcement from said inner side to said first outer side of the semi-preg such that said first outer side of the semi-preg has a tack that varies from 20 to 38 N;
  c) a second layer of fibrous reinforcement that is located on the other side of said first resin layer, said second layer of fibrous reinforcement having an inner side adjacent to said first resin layer and an outer side that forms said second outer side of the semipreg; and B) forming a property enhancing film on the outer side of said first layer of fibrous reinforcement, said property enhancing film comprising a mixture of uncured thermosetting resin and a rubber toughening component, said property enhancing film being in the form of a solid film that has an outer surface and an inside surface, said inside surface contacting and covering said first outer side of the semipreg, wherein said solid film weighs from 10 to 60 gsm and wherein the outer surface of said solid film has a tack level of 10 to 15 N to thereby control the tack level of the first outer side of said semi-preg to be more consistent and reduced.

17. A method for making a semi-preg material according to claim 16 wherein the first resin layer is present in an amount of 100 to 800 g/m$^2$ of the semi-preg material.

18. A method for making a semi-preg material according to claim 16 which includes the additional step of form said semi-preg material into a roll wherein said property enhancing film is located adjacent to and in contact with said second layer of fiber reinforcement.

19. A method for making as semi-preg material according to claim 16 wherein said property enhancing film comprises uncured solid bisphenol-epoxy resin, a rubber toughening component and nano sized core/shell rubber particles.

20. A method for making a semi-preg material according to claim 16 wherein said property enhancing film comprises uncured solid bisphenol-epoxy resin, a rubber toughening component and polyamide particles.

* * * * *